United States Patent [19]
Cope

[11] 3,712,691
[45] Jan. 23, 1973

[54] ELASTOMERIC SNUBBING SIDE BEARING

[75] Inventor: Geoffrey Wilton Cope, Williamsville, N.Y.

[73] Assignee: Dresser Industries, Inc., Dallas, Tex.

[22] Filed: Feb. 3, 1971

[21] Appl. No.: 112,156

[52] U.S. Cl. .............................308/138, 105/199 CB
[51] Int. Cl. ..........B61f 5/14, F16c 17/04, F16f 1/36
[58] Field of Search .........105/199 CB; 308/137, 138

[56] References Cited

UNITED STATES PATENTS

| | | | |
|---|---|---|---|
| 3,518,948 | 7/1970 | King et al. | 308/137 X |
| 3,151,918 | 10/1964 | Bachman et al. | 308/138 |
| 2,350,301 | 5/1944 | Cottrell | 308/138 |
| 2,547,852 | 4/1951 | Bryan | 308/138 |
| 2,788,250 | 4/1957 | Blattner | 308/138 |

Primary Examiner—Gerald M. Forlenza
Assistant Examiner—Howard Beltran
Attorney—Robert W. Mayer, Thomas P. Hubbard, Jr., Daniel Rubin, Raymond T. Majesko, Roy L. Van Winkle, William E. Johnson, Jr. and Eddie E. Scott

[57] ABSTRACT

A resilient side bearing installable between a truck and body of a railway vehicle containing a housing and a cover, and elastomeric solids disposed in spaced segments within the housing and bearing upon the cover.

7 Claims, 5 Drawing Figures

PATENTED JAN 23 1973　　　　　　　　　　　3,712,691

INVENTOR
GEOFFREY W. COPE

ATTORNEY

ELASTOMERIC SNUBBING SIDE BEARING

One tried and proven method of combatting "hunting" is the application of a constant frictional restraint to angular motion of the truck at the side bearings and a considerable number of constant contact resilient side bearings have been introduced with varying degrees of success.

The common failure of most prior art resilient side bearings is the inability to resist the development of "chucking" which is the relatively free movement of the shoe in the housing, or relative to the housing, from the friction component of the contact with the body side bearing. The "chucking" is in the direction of the required frictional restraint and therefore as soon as the magnitude of "chucking" is such that the truck can hunt to the extent of the railwheel flange clearance without relative movement of the friction faces the restraint is lost and "hunting" can develop.

Some previous resilient side bearings have been capable of resisting "chucking" in the fully extend condition when the friction component is minimum but have failed to do so in the fully compressed condition when the friction component is maximum. This was partially due also to the fact that coil springs and some designs of elastomeric springs provide lower resistance to lateral deflection when under load than when free.

The need to limit or eliminate "chucking" is therefore obvious, because it permits "hunting" either directly or indirectly by first permitting wear to develop excessive clearance. The side bearing "chucking" is self-destructive of the unit as was evidenced by current prior art designs being completely worn out after several months of service. Further, the normal sinusoidal tracking of a pair of steel wheels and fixed axle on a track can force truck "hunting" which in turn can and does get into phase with the natural frequency of the car yaw, and when this happens a nosing condition is set up which can become quite violent, especially if it occurs at high speed. The results of severe nosing are rapid wear of the truck components, particularly the wheel flanges, and sometimes derailment due to the wheel flange climbing the rail. The resilient side bearings of the present invention provides a resistance to side rotational translation of the truck, in cyclic fashion, in relation to the car body (hunting) and in so doing lowers the "hunting" frequency so that if it becomes synchronous with the car body yaw, it will only do so at a low speed where the energy input is too low to cause serious problems.

Accordingly, it is an object of this invention to provide a resilient or constant side bearing for use on a railroad truck to inhibit truck "huntin" or castor action with a minimum amount of "chucking" of the friction shoe in the housing.

A further object of this invention is to provide a resilient side bearing in which the resistance to "chucking" increases under load at a greater rate than the applied vertical load increases.

It is another object of this invention to provide an improved resilient side bearing which is simple in construction and substantially noiseless in operation.

Still another object of the invention is to provide a resilient side bearing having a rubbery material as its sole resilient means, which is self-adjusting, for maintaining full bearing with the contacted part of the car body.

In order to more fully understand the nature and objects of the present invention, reference should be had to the following detailed description and drawings in which.

Figure 1:
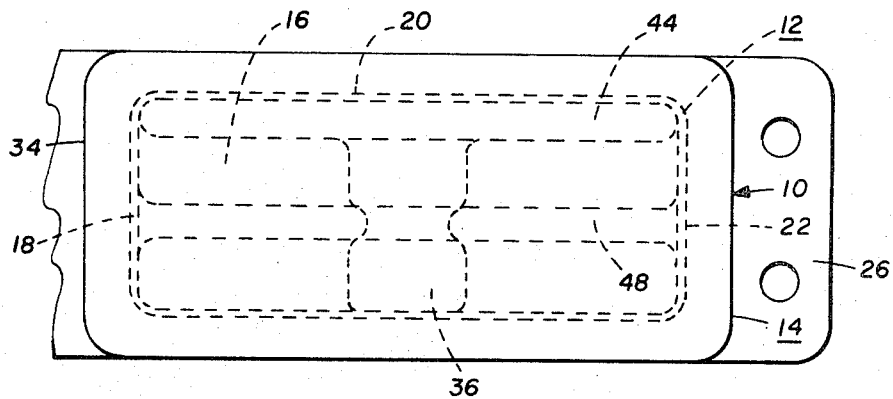
FIG. 1 is a plan view of a resilient side bearing according to the present invention.
Figure 2:
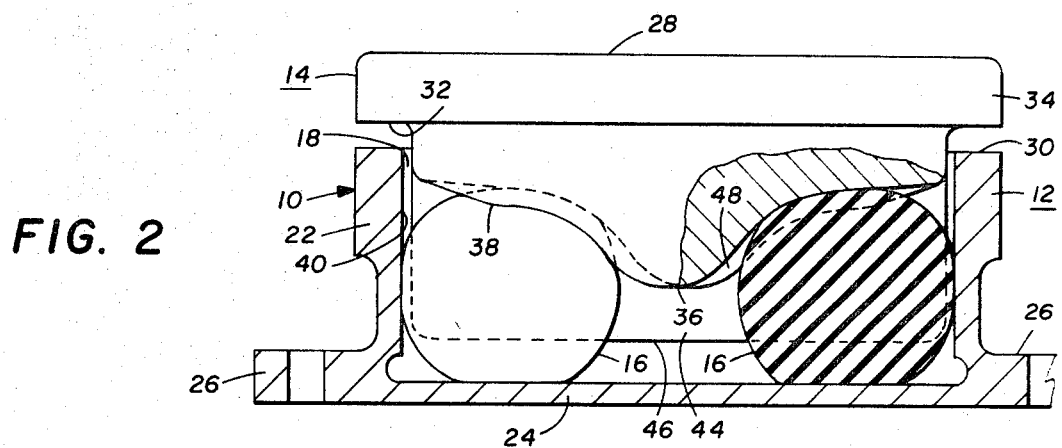
FIG. 2 is a side elevational view of the side bearing of FIG. 1.
Figure 3:
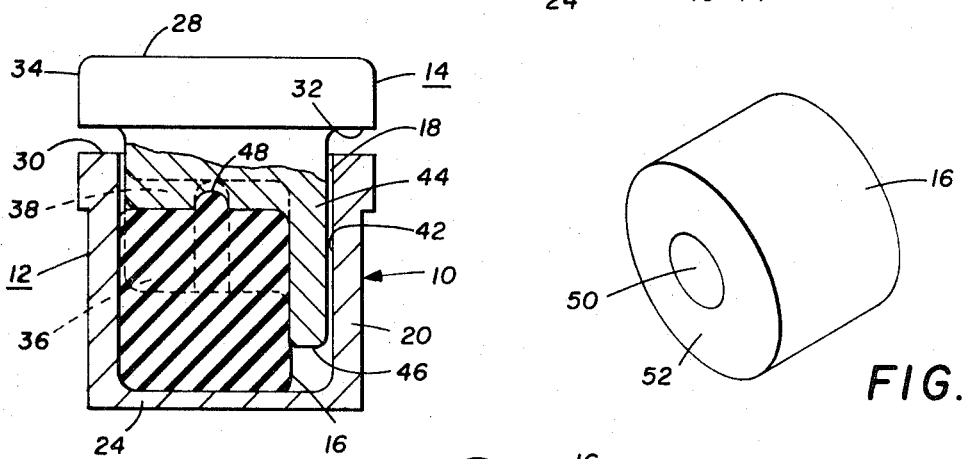
FIG. 3 is an end elevational view of the bearing of FIG. 2.
Figure 4:
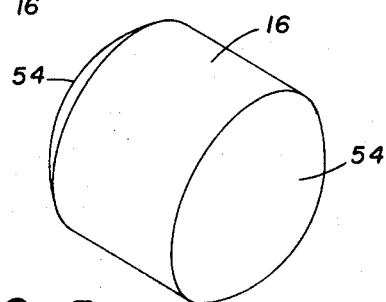
FIGS. 4 and 5 are perspective views of resilient members useful in the devices of the present invention.
Figure 5:
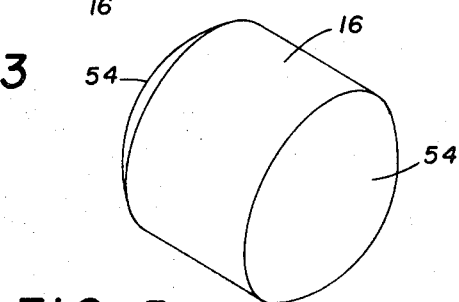

In accordance with the present invention, there is provided a resilient side bearing installable between a truck and body of a railway vehicle. The bearing comprises a base member having outer peripheral upstanding opposed sidewalls and end walls which are connected at a common corner to define a vertical cavity. A cap member extends between and is spaced from the walls for limited vertical and horizontal movement relative to the base member. The cap member has an upper bearing surface, substantially planer walls downstanding therefrom and opposing the upstanding walls and a lower surface having a downwardly projecting portion extending between the opposed upstanding sidewalls and substantially equidistantly spaced from the opposed upstanding end walls. Resilient members are disposed in the space within the cavity defined by the projecting portion and the opposed end walls and extend between opposed sidewalls substantially parallel to the projecting portion.

Referring now in detail to the accompanying drawings in which like reference characters designate like parts, the improved resilient side bearing 10 of the present invention, while illustrated uninstalled, is designed for installation on a bolster (not shown) of a railway truck (not shown) between the truck and a railway car body (not shown) and to engage a rigid bearing member (not shown) fixed to and depending from a body bolster (not shown) of the underframe (not shown) of the car body. A typical installation is illustrated in U.S. Pat. No. 2,788,250 assigned to the same assignee as the present invention.

The side bearing 10 is comprised of a base member or housing 12, a cap member 14 housed in the base member and resilient cushions 16 within the base member below and yieldably acting on the cap member 14 to urge the latter upwardly relative to the base member 12. As will become apparent, each of the base and cap members is designed and particularly lends itself to manufacture as a one-piece steel casting.

The base member is open at the top and has a central cavity 18 extending vertically therethrough and bounded laterally or horizontally by an upstanding, continuous wall of the base member. In the illustrated side bearing, the cavity 18 is substantially rectangular in cross section, and the continuous wall is formed by a pair of sidewalls 20, connected at their ends by a pair of end walls 22, the several walls being upstanding or substantially vertically directed, and the walls of each pair being transversally spaced from each other. The base member is closed at the bottom by a bottom wall 24.

For mounting the base member on a side frame or bolster of the previously mentioned railway truck, the lateral end walls 22 are provided with flanges 26 integral with the end wall and bottom wall and extending outwardly from the lower portion of the end wall at opposite sides thereof. The flanges 26 are each attachable to the bolster by welding, bolting, riveting, bracketing or by other means known to those skilled in the art, or can be cast integral with the bolster.

The cap member 14, housed in the base member, fits or seats in the central cavity 18 and is confined laterally or horizontally by the lateral wall of the base member. The cap member has a substantially flat, horizontally directed top wall 28 which projects above the upper edge 30 of the base member and is adapted to bear against the aforementioned bearing member depending from the car body bolster.

The cap member contains a substantially flat bottom wall 32 which is spaced vertically below and disposed substantially parallel to the top wall. The intermediate portion of the cap member connecting and spacing its top and bottom walls has a substantially vertically directed outer face 34 confronting and disposed substantially in alignment with the outer surface of the confining lateral wall of the base member. The lower surface of the cap member contains a gently sloping or contoured projecting portion 36 which extends between the opposed upstanding sidewalls 20 and is substantially equidistantly spaced from the opposed upstanding end walls 22. The sloping or contouring 38 begins from the flat lower surface 32 of the cap member 14 at a point that is vertically aligned with the cavity 18 in the base member such that when the cap member is in compression, the sloping portion 38 will be contained within the cavity 18 with a slight lateral clearance between the sloping and the inner surface 40 of the end wall 22. Clearance is also provided from the inner surface 42 of the sidewall 20.

Also extending downwardly from the lower surface of the cap member is a flange or leg 44 which is disposed within the cavity 18 and extends between the upstanding end walls 22 adjacent one of the upstanding sidewalls 20. The bottom 46 of the flange is normally spaced from the bottom wall 24 at a distance to prevent contact therewith when the cap member is in compression to the extent that surfaces 30 and 32 are in contact. While the drawing illustrates the flange to be continuous, it may consist of two or more spaced downwardly extending bars of sufficient area to provide adequate wear surface to compensate for a normal outward thrust of the cap from car body and truck action in service.

Across the sloping 38 and projecting portion 36 is an elongated slot 48 extending between end walls 22. The slot 48 may be of much greater depth such that it extends up to the lower surface 32 of the cap member. In such a case, it will cause a vertical separation of the sloping and projecting portion into two parts. The slot or groove (depending upon relative depth) serves two purposes, first to provide an interlock with the elastomer spring (described below) which, under compression, will enter the groove and laterally position the spring relative to the cap member, and second to provide a means of adjusting the shape factor of the spring. The size and depth of the groove or slot effects the load area and bulge area of the contacting elastomer and the spring rate is thereby partially governed, the other factors being the size of the elastomer spring, the durometer hardness of the material and the shape of the downstanding portion 36.

Disposed in the space defined by the sloping 38 and projecting portion 36, end walls 22 on each side of the projecting portion and bottom wall 24 is a cylindrical body 16 composed of a rubbery material, such as, a urethane elastomer. The cylindrical member 16 is in continuous contact with the sloping, projecting portion 36, end walls 22 and bottom walls 24. In one embodiment, the cylindrical body contains a substantially centrally located nonresilient core 50 extending between the end surfaces 52 thereof. The core may be composed of wood, plastic, metal, etc. In another embodiment, the cylindrical body has a convex end surfaces 54, to provide minimal contact between the body and one of the upstanding sidewalls 20 and the downwardly projecting flange or bar 44.

While the cylindrical member is shown to have a circular cross sectional configuration, it may be other, i.e., octagonal, depending upon the contour of the sloping.

In a normal position, the distance between the flat lower surface 32 of the cap member and the upper surface 30 of the upstanding lateral walls is about five-sixteenth inch. No. restriction is imposed in the interlock between the base and cap members on the relative upward vertical movement of the cap member because the upward relative movement is under all normal conditions constrained to maintain or hold the parts of the side bearing in assembled condition once it is mounted on the railway truck. As to downward vertical movement, when the rubbery body is compressed under the static load of the car body and which, while yielding and thus serving as a cushion, the lower surface of the cap member should not come into contact with the upper surface of the walls of the housing. However, under dynamic conditions of severe car body roll, the lower surfaces of the cap members will contact the upper surfaces of the sidewalls alternately to limit the roll angle.

Ordinarily, the side bearing of the present invention will be mounted on a railway truck with its long axis disposed longitudinally of the car body. So mounted, the resistance to longitudinal movement of the cap by the elastomeric springs 16 cooperating with the sloping downwardly projecting portion 36 and the end walls 22 prevents the friction component of the vertical force from imparting longitudinal (chucking) movement to the cap and thus inhibits by friction the angular movement of the truck and in doing so lowers the "hunting" tendency.

Also, as the vertical force is increased on one or the other of a pair of resilient side bearings of the present invention, the resistance to "chucking" is increased at a greater rate. This is contrary to prior art resilient side bearing designs having vertical load coil springs or some designs of elastomer springs which suffered lowered resistance to "chucking" with an increase in the vertical load in addition to the increase in "chucking" force from the increased friction component.

The simplicity of the resilient side bearings of the present invention readily lends it to assembly during installation. However, it will usually be preferred to assemble the side bearings at a place of manufacture, in which case, after the cap member and the elastomer springs have been inserted into the central aperture through the top of the housing, bands or clips may be employed for holding the parts in assembled relation prior to mounting. Once a side bearing is installed, the friction surface of the top of the cap member will constantly contact the bearing member on the body bolster as the latter moves relative to the truck bolster or side frame.

Having thus described the invention in detail and with sufficient particularly as to enable those skilled in the art to practice it, what is desired to have protected by Letters Patent is set forth in the following claims.

The embodiments of the invention in which an exclusive property or privilege is claimed are defined as follows:

1. A resilient side bearing resistant to chucking installable between a truck and body of a railway vehicle, comprising a base member having outer peripheral upstanding opposed sidewalls and end walls which are connected at a common corner, said sidewalls and end walls defining a vertical cavity, a cap member extending between and spaced from said walls for limited vertical and horizontal movement relative to said base member, said cap member having an upper bearing surface, substantially planer walls downstanding therefrom and opposing said upstanding walls and continuously curved lower substantially horizontal surface having a downwardly projecting portion extending between the opposed upstanding sidewalls and substantially equidistantly spaced from the opposed upstanding end walls, flange means extending downwardly from the lower surface of the cap member into the cavity adjacent one of the sidewalls, elastomeric resilient members disposed in the space within the cavity defined by the projecting portion and the opposed end walls and extending between an opposed sidewall and the flange means substantially parallel to the projecting portion.

2. The side bearing of claim 1, in which the projecting portion is gently contoured extending between the opposed upstanding end walls and between a sidewall and flange means, said contouring beginning on the lower surface of the cap member at a point that is vertically aligned with the cavity in the base member such that when the cap member is in compression, the contoured projecting portion is contained within the cavity with a slight lateral clearance between the beginning of the contouring and the inner surface of the end wall.

3. The side bearing of claim 1, in which the resilient member consists of a cylindrical body with end surfaces adjacent the upstanding sidewalls.

4. The side bearing of claim 2, in which the resilient member consists of a cylindrical body with end surfaces adjacent an upstanding sidewall and the downwardly directed flange.

5. The side bearing of claim 4, in which the end surfaces of the cylindrical body are convex.

6. The side bearing of claim 4, in which the cylindrical body contains a substantially centrally disposed nonresilient core extending between the end surfaces thereof.

7. The side bearing of claim 1, in which the projecting portion of the underside contains a lateral slot extending between upstanding end walls.

* * * * *